United States Patent
Schneider

(10) Patent No.: US 9,515,828 B2
(45) Date of Patent: *Dec. 6, 2016

(54) SHARING A SECRET VIA LINEAR INTERPOLATION

(71) Applicant: Red Hat, Inc., Raleigh, NC (US)

(72) Inventor: James P. Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/216,575

(22) Filed: Mar. 17, 2014

(65) Prior Publication Data

US 2014/0198911 A1    Jul. 17, 2014

Related U.S. Application Data

(63) Continuation of application No. 12/202,107, filed on Aug. 29, 2008, now Pat. No. 8,675,877.

(51) Int. Cl.
*H04L 29/06* (2006.01)
*H04L 9/14* (2006.01)
*H04L 9/08* (2006.01)

(52) U.S. Cl.
CPC ............ *H04L 9/14* (2013.01); *H04L 9/085* (2013.01); *H04L 9/0894* (2013.01)

(58) Field of Classification Search
CPC .......... H04L 9/14; H04L 9/085; H04L 9/0894
USPC .... 708/100, 135, 255, 274; 380/1, 228–229, 380/232, 255, 278, 281, 283, 28
See application file for complete search history.

(56) References Cited

U.S. PATENT DOCUMENTS

| | | | |
|---|---|---|---|
| 5,625,692 A * | 4/1997 | Herzberg et al. | 380/286 |
| 7,421,080 B2 | 9/2008 | Matsumura et al. | |
| 8,074,068 B2 * | 12/2011 | Fujii et al. | 713/160 |
| 8,077,863 B2 * | 12/2011 | Hosaka et al. | 380/28 |
| 2002/0164033 A1 * | 11/2002 | Rajasekaran | 380/278 |
| 2003/0081785 A1 * | 5/2003 | Boneh et al. | 380/277 |
| 2003/0115251 A1 | 6/2003 | Fredrickson et al. | |
| 2003/0147535 A1 | 8/2003 | Nadooshan et al. | |
| 2006/0023887 A1 * | 2/2006 | Agrawal et al. | 380/277 |
| 2006/0083372 A1 | 4/2006 | Chang et al. | |
| 2007/0160197 A1 * | 7/2007 | Kagaya et al. | 380/28 |
| 2009/0060175 A1 * | 3/2009 | Schneider | 380/28 |
| 2009/0077379 A1 * | 3/2009 | Geyzel et al. | 713/170 |
| 2009/0136024 A1 * | 5/2009 | Schneider | 380/28 |
| 2009/0310779 A1 * | 12/2009 | Lam et al. | 380/46 |
| 2010/0054458 A1 | 3/2010 | Schneider | |
| 2010/0217978 A1 * | 8/2010 | Schneider | 713/168 |

OTHER PUBLICATIONS

Adi Shamir, "How to Share a Secret", 1979, Communications of the ACM, vol. 22 No. 11, pp. 612-613.*

(Continued)

*Primary Examiner* — John B King
(74) *Attorney, Agent, or Firm* — Lowenstein Sandler LLP

(57) ABSTRACT

A method and system distributes shares of a secret among cooperating entities using linear interpolation. In one embodiment, a linear equation is formed using the secret and random elements. The linear equation represents a K-dimensional hyperplane, where K is the number of shares to reconstruct the secret. Shares of the secrets are created, with each share corresponding to a point on the secret hyperplane. The shares are then distributed to cooperating entities for secret sharing.

14 Claims, 9 Drawing Sheets

CONSTRUCT M SHARES OF A SECRET

(56) References Cited

OTHER PUBLICATIONS

Asmuth, Charles, et al., "A Modular Approach to Key Safeguarding," IEEE Transactions on Information Theory, vol. IT-29, No. 2, Mar. 1983, pp. 208-210.
Blakely, G.R. et al., "Safeguarding Cryptographic Keys," National Computer Conference, 1979, AFIPS—Conference Proceedings, vol. 48, AFIPS Press, Montvale, NH 07645, pp. 313-317.
Blakely, G.R. et al., "Security of Ramp Schemes," Lecture Notes in Computer Science—Advances in Cryptology, Proceedings of CRYPTO 84, Springer-Verlag, pp. 242-268.
Schneier, Bruce, "Applied Cyptography, Second Edition—Protocols Algorithms and Souce Code in C," 1996© John Wiley & Sons, Inc., title pages, pp. viii and 47-74.
Shamir, Adi, et al., "How to Share a Secret," Programming Techniques, Communications of the ACM, Nov. 1979, vol. 22, No. 11, pp. 612-613.
USPTO Office Action for U.S. Appl. No. 12/202,107 mailed Oct. 7, 2011.
USPTO Office Action for U.S. Appl. No. 12/202,107 mailed Apr. 3, 2012.
USPTO Notice of Allowance for U.S. Appl. No. 12/202,107 mailed Oct. 24, 2013.
USPTO Office Action for U.S. Appl. No. 12/202,111 mailed Mar. 18, 2011.
USPTO Office Action for U.S. Appl. No. 12/202,111 mailed Mar. 12, 2012.
USPTO Notice of Allowance for U.S. Appl. No. 12/202,111 mailed Sep. 20, 2012.

* cited by examiner

MATRIX CONVERSION FOR SHARE RECONSTRUCTION

SHARING A SECRET VIA LINEAR INTERPOLATION

CROSS-REFERENCE TO RELATED APPLICATIONS

This application is a continuation of U.S. patent application Ser. No. 12/202,107, filed Aug. 29, 2008, and hereby incorporated by reference.

TECHNICAL FIELD

Embodiments of the present disclosure relate to cryptographic techniques, and more specifically, to sharing a secret among cooperating parties.

BACKGROUND

In cryptography, secret sharing refers to any method for distributing a secret among a group of participants, each of which is allocated one or more shares of the secret. The secret can only be reconstructed when a required number of shares are combined together; individual shares are of no use on their own.

A secure secret sharing scheme distributes shares so that anyone with fewer than the required shares has no extra information about the secret than someone with zero shares. Some secret sharing schemes allow the secret to be reconstructed by a subset of the total number of generated shares. Thus, a secret can be reconstructed even when some of the share are lost or when some of the share holders are absent.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
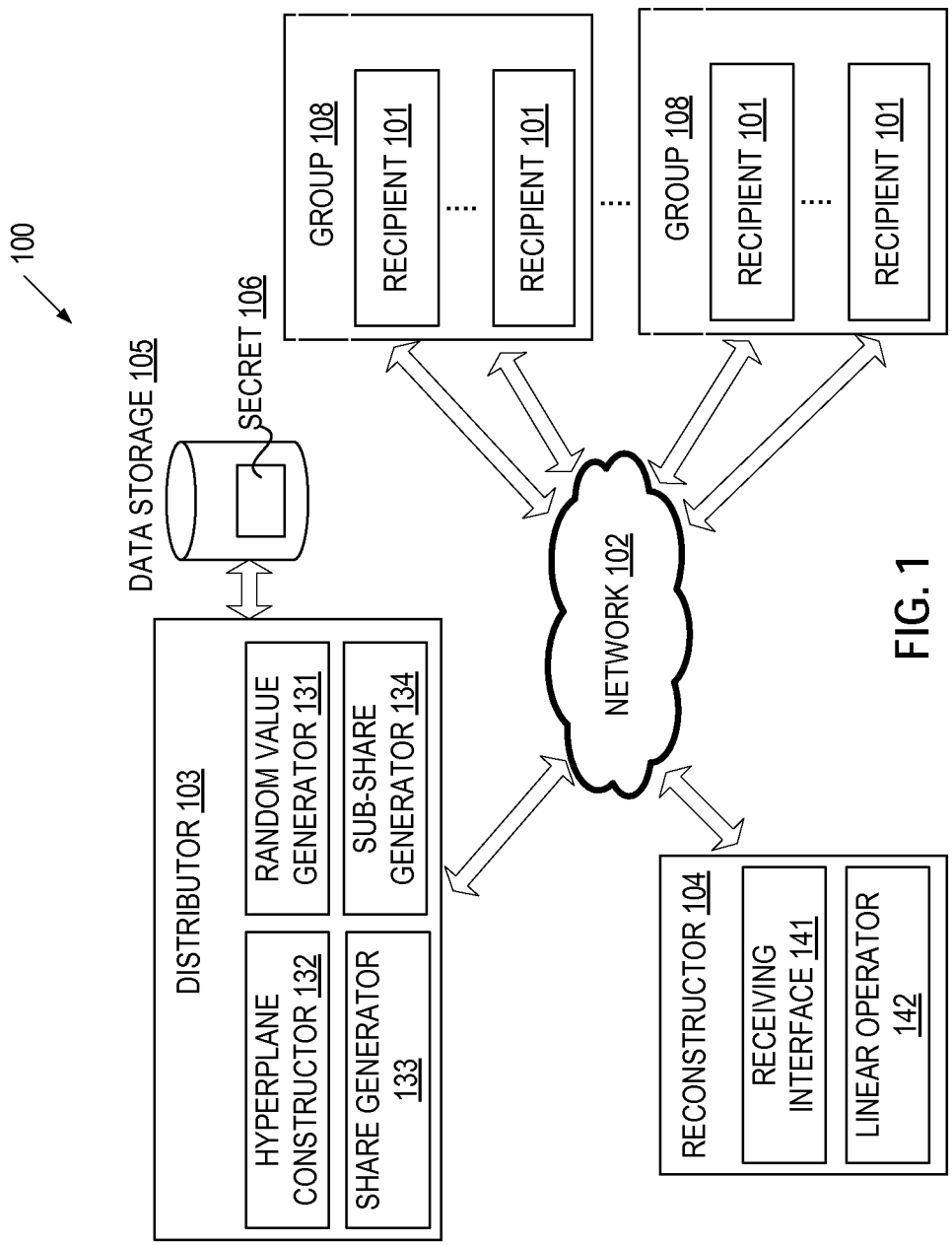
FIG. 1 illustrates a network architecture in which embodiments of the present invention may be implemented.

A method and system distributes shares of a secret among cooperating entities using linear interpolation. In one embodiment, a linear equation is formed using the secret and random elements. The linear equation represents a K-dimensional secret hyperplane, where K is the number of shares to reconstruct the secret. Shares of the secrets are created, with each share containing a point on the secret hyperplane. The shares are then distributed to cooperating entities for secret sharing.

An exemplary use of the secret sharing technique is a multi-factor key escrow system, where shares from a master key are given to a set of federated entities such that a subset of these shares can be used to reconstruct the master key. For example, an employee of a company in a high-security position (e.g., a corporate controller, or a human resources specialist) may have a master password that protects a secret key they need to use to authenticate on their corporate workstation. Ordinarily, this master key is only used by this employee. However, if something were to happen to this employee, his/her replacement would need to be able to gain access to this master key. As the master key provides its owner access to sensitive data, the company cannot just give a backup copy of the master key to someone for safe keeping (e.g., it would be disastrous if a disgruntled employee was able to cut himself a million dollar severance check). Thus, the master key can be split up into multiple shares, so that a share is held by each of several trusted employees. A minimum number of these trusted employees would need to present their shares and reconstruct the secret (i.e., the master key). Illustratively, one share may go to the employee's boss, and other shares may be distributed to other department heads or managers.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "forming", "using", "generating", "computing", "distributing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary cryptosystem 100 in which embodiments of the present invention may operate. The cryptosystem 100 includes a plurality of recipients 101 and a distributor 103 coupled by a network 102, which may be a public network (e.g., Internet) or a private network (e.g., Ethernet or a Local Area Network (LAN)). In one embodiment, each of the distributor 103 and recipients 101 is a computing system that manages secret information. Alternatively, the distributor 103 may be a computing system and each recipient 101 may be a storage device for receiving and storing one or more shares of a secret. The distributor 103 is locally coupled to data storage 105 in which a secret 106 is stored. Data storage 105 may include one or more storage devices (e.g., the computer-readable medium described above) that are local to the distributor 103 and/or remote from the distributor 103. In alternative embodiments, the secret 106 may be stored in the main memory of the distributor 103. In one embodiment, the secret 106 may be a cryptographic key, a password, or any secret data to be jointly held in escrow by the recipients 101.

According to one embodiment of the invention, to safeguard the secret 106, the distributor 103 generates a plurality of shares of the secret 106 and distributes one or more shares to each of the recipients 101 through the network 102. The secret 106 can be reconstructed from a subset of the distributed shares. In one embodiment, the cryptosystem 100 also includes a reconstructor 104 to reconstruct the secret 106 using the distributed shares. The reconstructor 104 collects the received shares of the secret to form a matrix, and extracts the secret from the received shares. A person of ordinary skill in the art would appreciate that the reconstructor 104 may be a separate computing system as shown in FIG. 1, or, alternatively, reside in the same computing system as the distributor 103 or any of the recipients 101. In one embodiment, the distributor 103, the recipients 101 and/or the reconstructor 104 may be, for example, servers, personal computers (PCs), mobile phones, palm-sized computing devices, personal digital assistants (PDAs), or the like.

In one embodiment, the recipients 101 are grouped into a plurality of groups 108, with each group 108 representing a different organization, department, geographical location, etc. Instead of distributing the shares to the recipients 101 directly, the distributor 103 divides the shares into sub-shares, and distributes the sub-shares to the recipients 101. The recipients within the same division 108 receive the sub-shares that are derived from the same share. The original secret can be reconstructed when a required number of groups and a required number of recipients 101 cooperate.

For example, a large organization may have a requirement that at least two departments authorize the use of the shared secret, and, in each department, at least two department members have to sign off on the authorization. To satisfy this requirement, an embodiment of the secret sharing process starts with representing the secret as "secret hyperplane" in some suitable field. The process then constructs a set of ordered pairs that represent points on the secret hyperplane. The ordered pairs form shares of the secret, one per department. For each share, the process constructs a set of secondary hyperplanes that intersect at the point represented by the ordered pair of the share. These secondary hyperplanes are the "sub-shares" that are to be distributed to the individual responsible parties in each department. Thus, no single department can reconstruct the secret, even if everybody with a share in that department cooperates.

A basic form of the secret sharing process operates under the condition that the number of required shares is the same as the number of required sub-shared. However, variations of the process allow the required shares and sub-shares to be different. In one scenario, one level of the hierarchy may require more cooperating parties than another level; for example, only two out of three departments are needed to reconstruct the original secret, but three of five people in each department are needed to reconstruct the divisional shares. In this scenario, variations of the process may change the thresholds for required shares (or sub-shares) so that they match from level to level, may provide one or both levels extra shares (or sub-shares), or may provide some of the random information to one of the levels outside of the secret sharing scheme. Examples of these variations will be provided after the secret sharing and reconstruction process has been fully described in FIGS. 1-8.

The computations for the secret sharing and reconstruction process described herein can be performed in any field, including any finite (such as a field with a prime number of elements, or a power of a prime number of elements) or infinite field (such as the rational numbers). They may also be performed in any ring where a large fraction of the elements have multiplicative inverses (such as square matrices of a given size over any field, or polynomials over any field), but the generated shares would need to be checked to ensure that the secret could be reconstructed. It is understood that the use of finite fields in the examples provided below is both illustrative and non-limiting.

In one embodiment, the distributor 103 includes a random value generator 131, a hyperplane constructor 132, a share generator 133, and a sub-share generator 134 to generate the shares and the sub-shares. The reconstructor 104 includes a receiving interface 141 to collect shares and sub-shares of the secret 106 from the recipients 101, and a linear operator 142 to reconstruct the secret 106 from the distributed shares and the sub-shares. Each of the random value generator 131, the hyperplane constructor 132, the share generator 133, the sub-share generator 134, and the linear operator 142 includes arithmetic processing units, such as adders, multipliers, random element generators, subtractors, etc., as well as memory circuitry, such as registers, RAM, etc., to perform mathematical calculations. The functions of these components will be described in greater detail below in connection with FIGS. 2-8.

Figure 2:
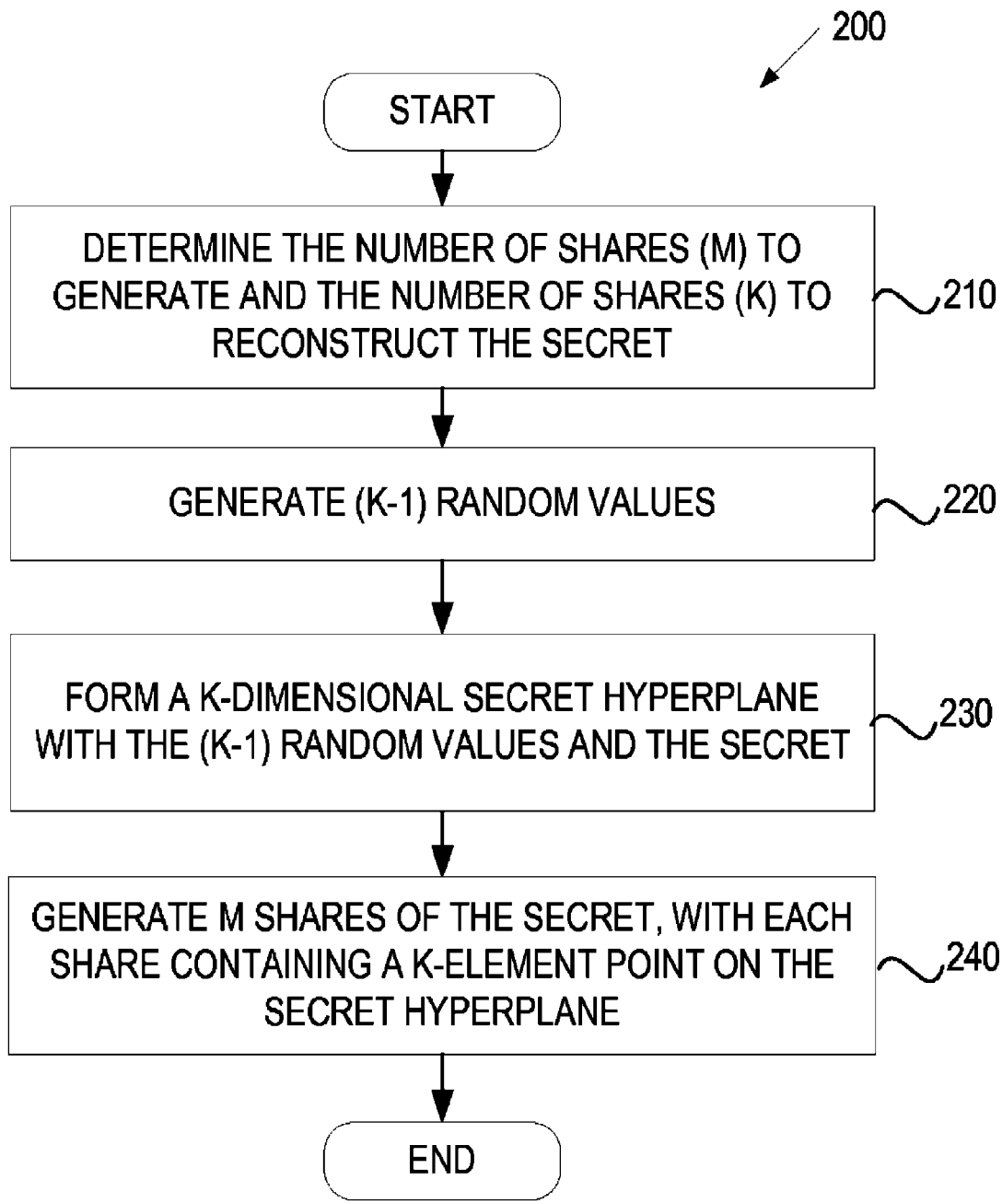
FIG. 2 is a flow diagram of a method for share generation according to one embodiment of the present invention.

FIG. 2 illustrates a flow diagram of one embodiment of a method 200 for generating a plurality of shares from a secret (e.g., the secret 106). The method 200 may be performed by the processing logic 926 of FIG. 9 that may comprise hardware (e.g., circuitry, dedicated logic, programmable logic, microcode, etc.), software (such as instructions on a computer readable storage medium executable by a processing device), or a combination thereof. In one embodiment, the method 200 is performed by the distributor 103 of FIG. 1.

Referring to FIG. 2, at block 210, the method 200 begins with the distributor 103 determining the total number (M) of shares to generate and the number (K) of shares for reconstruction. Alternatively, the determination may be made by a user or an administrator of the distributor 103. The determination may be based on the available computing or storage resources, the available number of groups 108 and recipients 101 that can jointly hold the shares of the secret, and other concerns (e.g., security). In a scenario where the shares are further divided into sub-shares for distribution, the parameters M and K may be chosen such that the required number of groups 108 for secret reconstruction and the required number of recipients 101 for share reconstruction can be satisfied.

Continuing to block 220, the random value generator 131 of the distributor 103 generates (K−1) non-zero random values. These random values are to be used as the coefficients of a linear equation that defines a hyperplane. At block 230, the hyperplane constructor 132 of the distributor 103 forms a linear equation of K variables using the (K−1) random values and the secret. The linear equation defines a K-dimensional hyperplane (referred to as a "secret hyperplane") on which the secret is embedded. The linear equation can be represented as: $a_1x_1+a_2x_2+a_3x_3+ \ldots +a_kx_k=c$, where $x_1, x_2, \ldots, x_k$ are variables, $a_1, a_2, \ldots, a_k$ are the coefficients, and c is the constant term. In a basic form of the process, the coefficients and the constant term are the unknowns during secret reconstruction, as they are not communicated to the recipients 101 and the reconstructors 104. To limit the number of unknowns to K such that K shares of the secret can reconstruct the secret, one of the coefficients (e.g., $a_1$) is set to a known value (e.g., 1). The other (K−1) coefficients (e.g., $a_2, \ldots, a_k$) are set to be the (K−1) random values generated at block 220. The secret may be used as the constant term c. Alternatively, the sum of the (K−1) random values plus the secret may be used as the constant term.

In yet another embodiment, the coefficients of the linear equation $a_2, a_3, \ldots, a_k$ can be derived by extending the secret to a larger size, such that the extended secret can be chopped up into the necessary coefficients. For example, if the secret sharing operation is performed in the field $GF(89^5)$, and the secret is represented as a $4^{th}$ degree polynomial over $GF(89)$, an extended polynomial of a higher degree (e.g., $14^{th}$ degree) can be constructed from the secret. Five coefficients of the extended polynomial can be taken at a time to form an element of $GF(89^5)$, which can be used as a single coefficient for the linear equation. One approach to creating an extended polynomial from a secret polynomial S (which is the secret represented as a polynomial over GF(q)) is described as follows. First, a polynomial P over GF(q) of degree d is created and published, where d is at least one greater than the largest secret to be represented. A random polynomial over GF(q) of degree (m−d) is also created, where m is the degree of the extended polynomial. The extended polynomial E can be constructed as P*R+S, where P is the published polynomial, R is the generated random polynomial, and S is the secret polynomial. One skilled in the art would be able to perform analogous operations in other fields or rings.

Continuing to block 240, the random value generator 131 generates another (K−1) random values. The share generator 133 of the distributor 103 substitutes the (K−1) random values for (K−1) variables (e.g., $x_2, \ldots, x_k$), and solves for the remaining variable (e.g., $x_1$). The values of the K variables form a share of the secret. Thus, each share containing K elements, which constitute a point on the K-dimensional secret hyperplane. The share generator 133 repeats the share generation M times to generate M shares of the secret. In one embodiment, the distributor 103 distributes the M shares to the recipients 101. Alternatively, the distributor 103 may continue to calculate sub-shares of the shares, as will be described in connection with FIG. 3. The method 200 then terminates.

Figure 3:
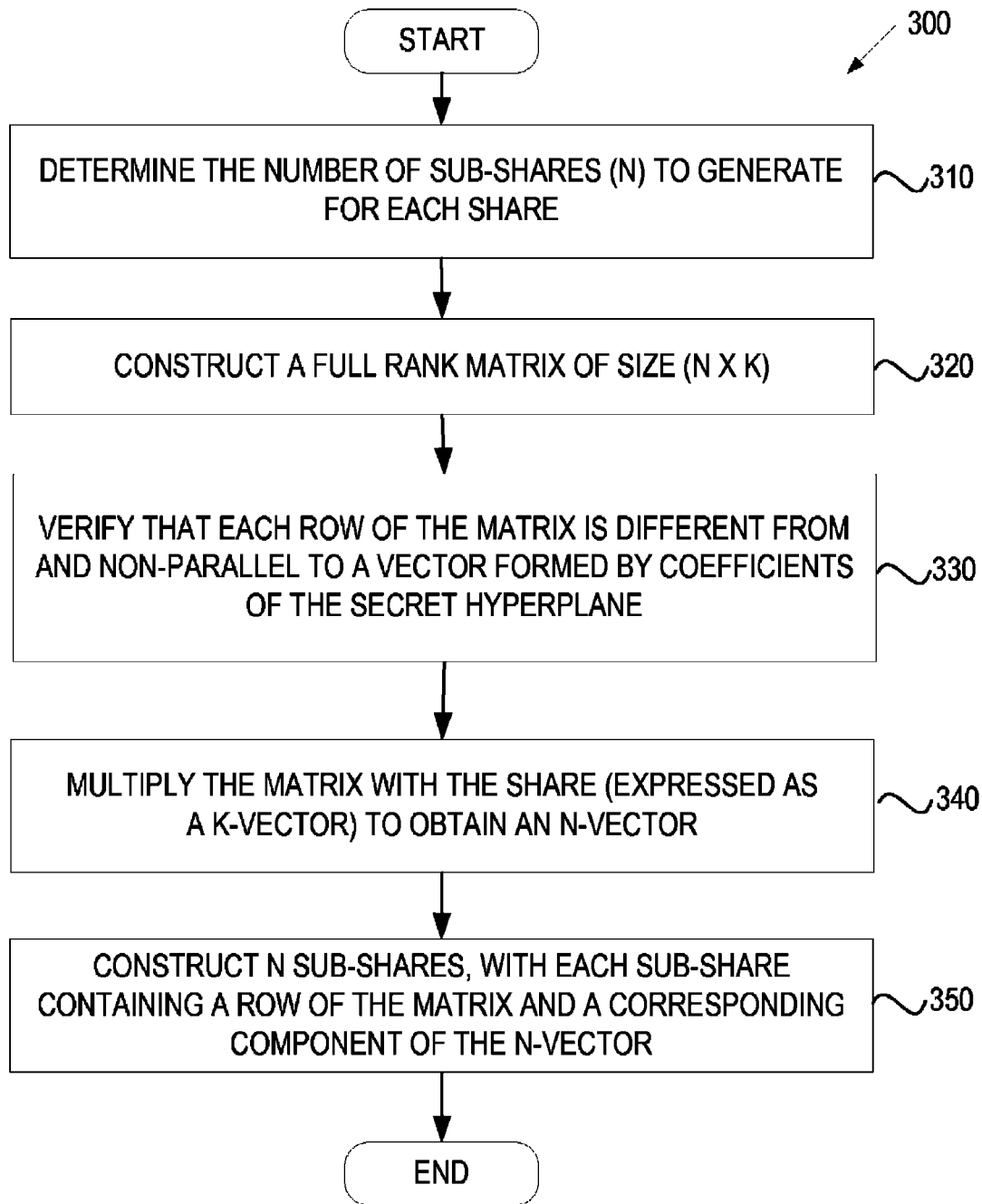
FIG. 3 is a flow diagram of a method for sub-share generation according to one embodiment of the present invention.

FIG. 3 illustrates a flow diagram of one embodiment of a method 300 for generating a plurality of sub-shares from a share. The method 300 may be performed by the processing logic 926 of FIG. 9 that may comprise hardware (e.g., circuitry, dedicated logic, programmable logic, microcode, etc.), software (such as instructions on a computer readable storage medium executable by a processing device), or a combination thereof. In one embodiment, the method 300 is performed by the distributor 103 of FIG. 1.

Referring to FIG. 3, at block 310, the method 300 begins with the distributor 103 determining the number (N) of sub-shares to generate for each share. The number of sub-shares (N) to generate for a given share can be determined independently of the value of M (the total number of shares). Alternatively, the determination may be made by a user or an administrator of the distributor 103. The determination may be based on the available computing or storage resources, the available number of groups 108 and recipients 101 that can jointly hold the shares of the secret, and other concerns (e.g., security). The number of required sub-shares for share reconstruction is K, which is the same as the number of required shares for secret reconstruction. In some embodiments, every share of the secret is divided into N sub-shares for distribution to recipients 101. In some other embodiments, one or more of the shares may be designated as global shares, and no sub-shares are generated for these global shares. The global shares are distributed to each of the recipients 101 in every group 108. The global shares may be used when the number of required groups 108 for secret reconstruction does not match the number of required recipients 101 for share reconstruction. An example of the use of global shares will be provided after the secret sharing and reconstruction process has been fully described in FIGS. 1-8.

Continuing to block 320, the sub-share generator 134 of the distributor 103 constructs a random matrix of size (N×K). The (N×K) matrix has rank K; that is, the matrix has K linearly independent columns. As a matrix of size (N×K) can at most have K linearly independent columns, the matrix is said to have full rank or maximal rank. Two embodiments of generating a full rank matrix of size (N×K) will be described in greater detail with reference to FIGS. 6 and 7. At block 330, the distributor 103 verifies that each row of the matrix is different from and non-parallel to the K-vector formed by the coefficients $(a_1, a_2, \ldots, a_k)$ of the secret hyperplane. Two vectors are parallel to each other if one is a multiple of another. In one embodiment, the distributor 103 scales the vectors to match their first components, and compare the rest of the components to see if they are the same. If the rest of the components are the same, the row vector of the matrix is replaced by another row vector (e.g., the sum of the row and another non-parallel row).

Continuing to block 340, the sub-share generator 134 multiplies the (N×K) matrix with the K elements (expressed as a K-vector) in the given share. The multiplication produces an N-vector. At block 340, the sub-share generator 134 generates N sub-shares of the given share, with each share containing (K+1) components: K components come from one of the N rows of the (N×K) matrix, and an additional component comes from the corresponding component of the N-vector (e.g., row R of the matrix and R-th component of the N-vector). The (K+1) components of each sub-share represent a linear equation that defines a K-dimensional hyperplane (referred to as a "secondary hyperplane"). The distributor 103 then distributes the N sub-shares to the recipients 101 and the method 300 terminates.

It is understood that the above operations in FIGS. 2 and 3 may follow a different sequence from what is shown and may include additional operations. It is also understood that the row and column dimensions of the (N×K) matrix can be transposed as long as the corresponding matrix operations are transposed as well. It is also understood that the above computations using the (N×K) matrix may be replaced by equivalent linear operations that do not involves matrices. For example, the distributor 103 may generate N linear equations in K variables, and evaluate each of the equations at the K elements of the share. This linear equation approach is equivalent to the operations in matrix form.

Figure 4:
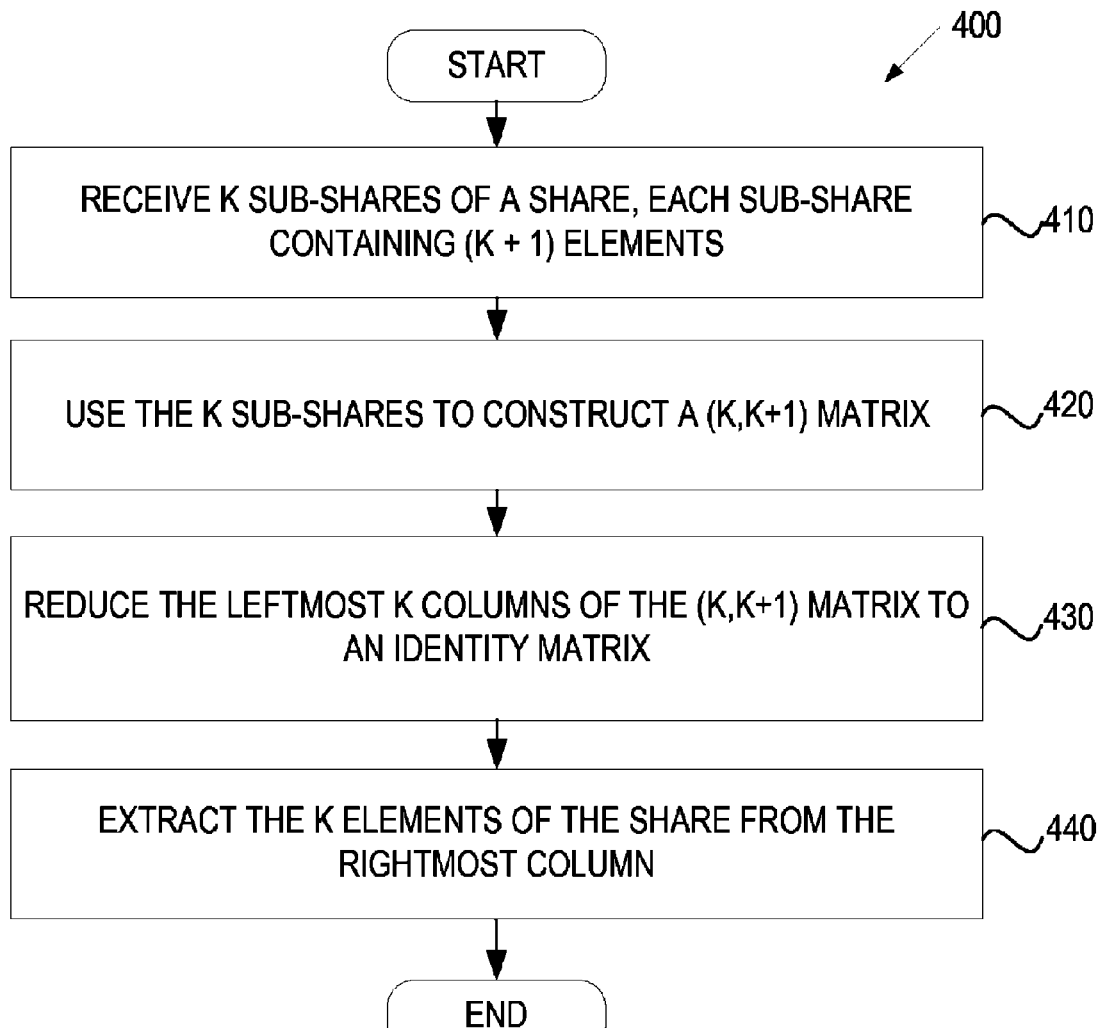
FIG. 4 illustrates a method for reconstructing a share from sub-shares according to one embodiment of the present invention.

FIG. 4 illustrates a flow diagram of one embodiment of a method 400 for reconstructing a given share from a subset of the sub-shares. The method 400 may be performed by the processing logic 926 of FIG. 9 that may comprise hardware (e.g., circuitry, dedicated logic, programmable logic, microcode, etc.), software (such as instructions on a computer readable storage medium executable by a processing device), or a combination thereof. In one embodiment, the method 400 is performed by the reconstructor 104 of FIG. 1.

Referring to FIG. 4, at block 410, the method 400 begins with the receiving interface 141 of the reconstructor 104 receiving K of the N sub-shares from the recipients 101 within one of the groups 108. At block 420, the reconstructor 104 use the K sub-shares to construct a (K, K+1) matrix. Each of the K sub-shares is placed in a separate row of the matrix. At block 430, the linear operator 142 of the reconstructor 104 converts the leftmost K columns of the (K, K+1) matrix into an identity matrix. An identity matrix has identity elements along the diagonal and zeros elsewhere. The conversion can be performed by a sequence of multiplications and additions. At block 440, after the conversion, the rightmost column of the (K, K+1) matrix is the K elements that constitute the share. The method 400 then terminates.

Figure 5:
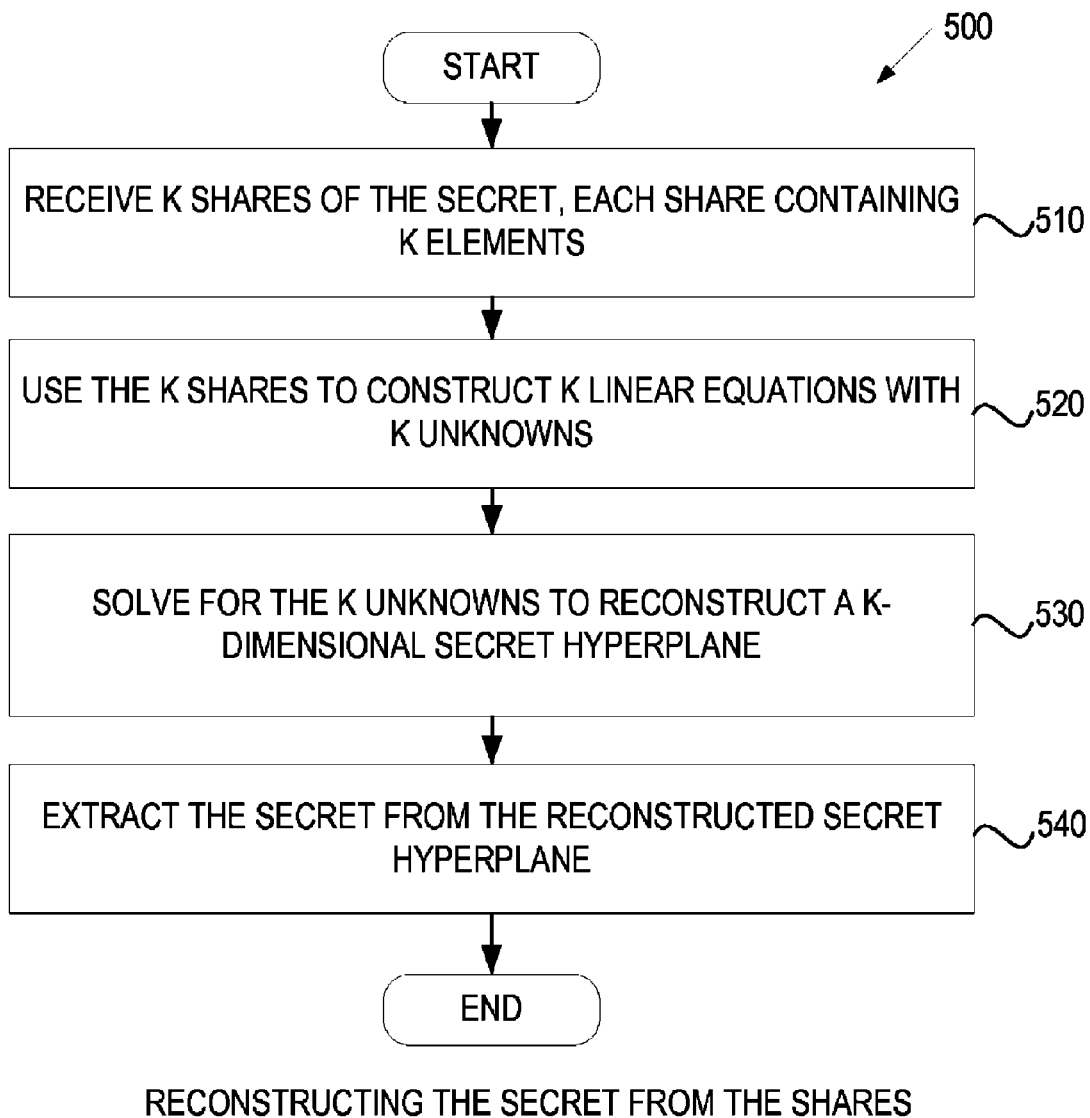
FIG. 5 illustrates a method for reconstructing the secret from the shares according to one embodiment of the present invention.

FIG. 5 illustrates a flow diagram of one embodiment of a method 500 for reconstructing the secret from a subset of the distributed shares. The method 500 may be performed by the processing logic 926 of FIG. 9 that may comprise hardware (e.g., circuitry, dedicated logic, programmable logic, microcode, etc.), software (such as instructions on a computer readable storage medium executable by a processing device), or a combination thereof. In one embodiment, the method 500 is performed by the reconstructor 104 of FIG. 1.

Referring to FIG. 5, at block 510, the method 500 begins with the receiving interface 141 of the reconstructor 104 receiving K shares of the secret, each share containing K elements. Some or all of these K shares may be reconstructed from their respective sub-shares. At block 520, the reconstructor 104 uses the K shares to form K linear equations with K unknowns (e.g., $a_2, \ldots, a_k$ and c of the secret hyperplane). At block 530, the reconstructor 104 reconstructs the secret hyperplane by solving for the K unknowns, using back substitution, matrix conversion, or other linear operations. At block 540, the reconstuctor 104 extracts the secret from the solved unknowns. The secret may be one of the solved unknowns or a linear combination of the solved unknowns.

Having described the techniques for generation and reconstruction of shares and sub-shares, the following descriptions explain, in detail, embodiments of the techniques for generating a full rank matrix (which are the operations performed at block 320 of FIG. 3), and for converting a matrix into an identity matrix (which are the operations performed at block 430 of FIG. 4).

Figure 6:
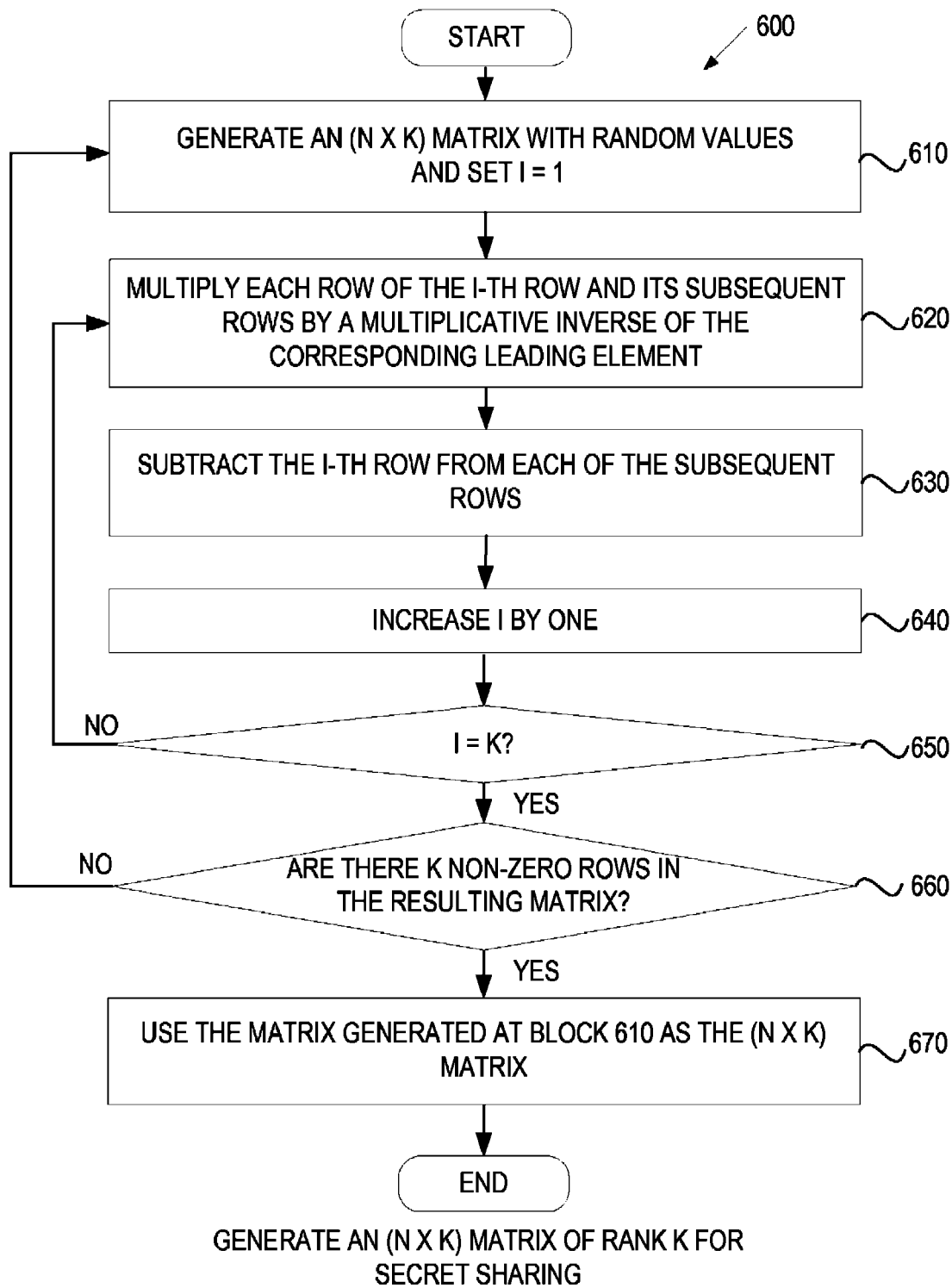
FIG. 6 illustrates a flow diagram of one embodiment of a method for generating a full rank random matrix for secret sharing.

FIG. 6 illustrates a flow diagram of a first embodiment of a method 600 for generating a full rank matrix. The method 600 can be applied to a matrix of any size, including a rectangular matrix and a square matrix. The method 600 may be performed by the processing logic 926 of FIG. 9 that may comprise hardware (e.g., circuitry, dedicated logic, programmable logic, microcode, etc.), software (such as instructions on a computer readable storage medium executable by a processing device), or a combination thereof. In one embodiment, the method 600 is performed by the sub-share generator 134 of FIG. 1.

Referring to FIG. 6, at block 610, the sub-share generator 134 generates an (N×K) matrix with random values. After the generation of the matrix, the sub-share generator 134 verifies the rank of the matrix. To verify that the rank of the matrix is K, the sub-share generator 134 performs a sequence of row operations to reduce the matrix into an upper triangular matrix (i.e., a matrix with all of its elements below the diagonal being zero). The verification process starts with setting a counter value I to one. The value I indicates the row number being processed.

At block 620, the sub-share generator 134 multiplies each of the I-th row and the rows below the I-th row by a multiplicative inverse of its non-zero leading term. In a finite field, the multiplicative inverse of a term 'A' can be computed by solving the expression $Ax + fy = i$, where f is the prime number or the primitive polynomial that generates the field, i is the multiplicative identity of the field, and x is the multiplicative inverse of A. A known technique for solving the above expression is the extended Euclidean algorithm, which is an iterative algorithm that includes a sequence of division, multiplication and subtraction. Computing the multiplicative inverse in a finite field using the extended Euclidean algorithm is known in the art. Thus, the details of the computation are omitted to simplify the discussion.

After the rows (from I to N) are multiplied by a multiplicative inverse of its respective leading non-zero term, each of these rows has a non-zero leading term equal to the identity element.

At block 630, the sub-share generator 134 subtracts the I-th row from each of the subsequent rows. At block 640, the counter value is increases by one to process the next row. If the counter value I is equal to K at block 650, the method 600 proceeds to block 660. If, at block 650, the counter value I is less than K, the operations at blocks 620-640 are repeated until I=K, and the method 600 proceeds to block 660.

At block 660, the sub-share generator 134 determines whether there are K non-zero rows in the resulting matrix. If it is determined that there are K non-zero rows in the resulting matrix, the rank of the matrix is K, and the method 600 proceeds to block 670. If it is determined that there are fewer than K non-zero rows in the resulting matrix, the rank of the matrix is less than K. Thus, the operations at blocks 610-660 are repeated until a matrix of rank K is generated and the method 600 proceeds to block 670. At block 670, it has been verified that the matrix generated at block 610 has rank K and can be used as the (N×K) matrix for generating shares of a secret. The method 600 then terminates.

Figure 7:
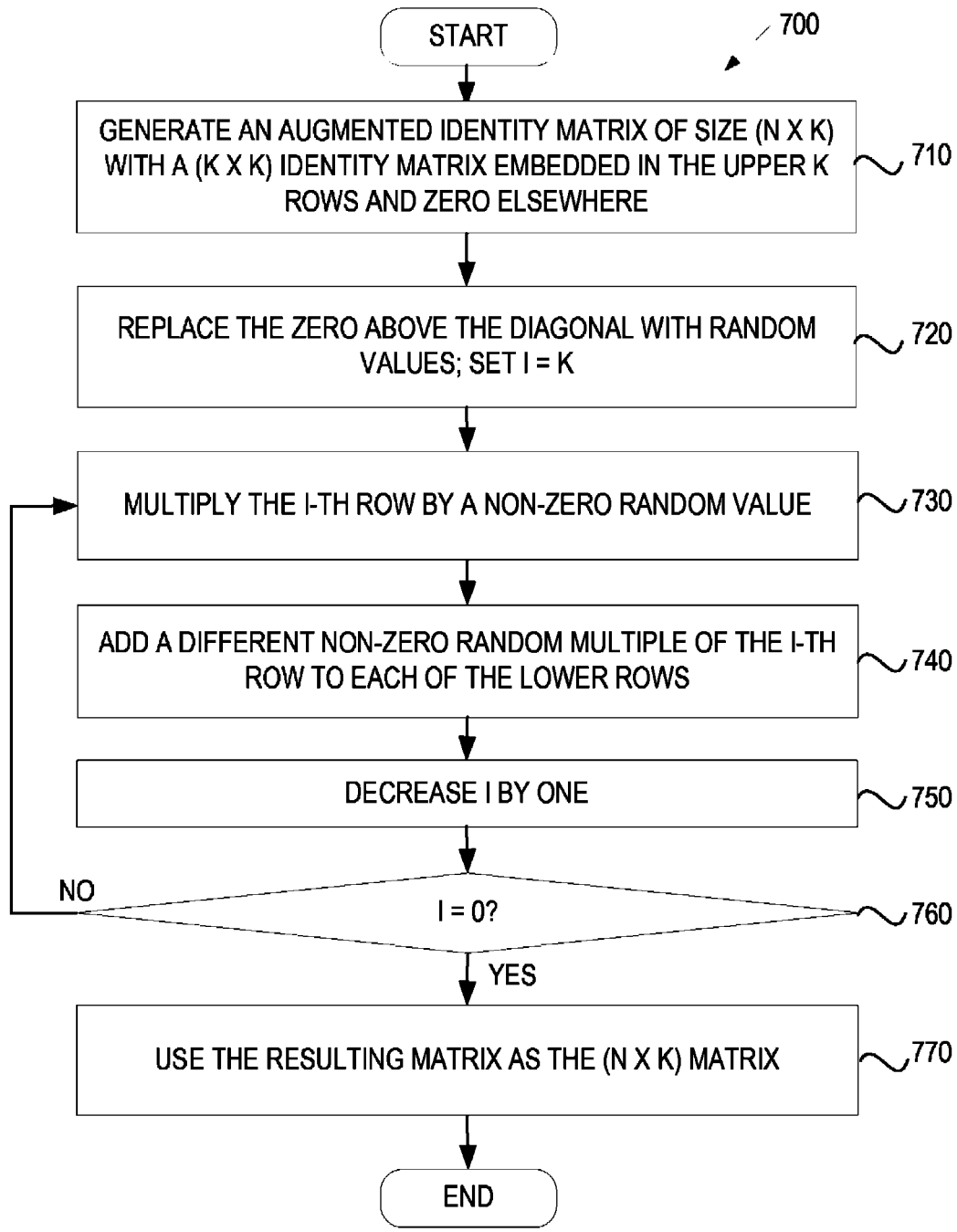
FIG. 7 illustrates a flow diagram of an alternative embodiment of a method for generating a full rank random matrix for secret sharing.

FIG. 7 illustrates a flow diagram of a first embodiment of a method 700 for generating a full rank matrix. The method 700 can be applied to a matrix of any size, including a rectangular matrix and a square matrix. The method 700 may be performed by the processing logic 926 of FIG. 9 that may comprise hardware (e.g., circuitry, dedicated logic, programmable logic, microcode, etc.), software (such as instructions on a computer readable storage medium executable by a processing device), or a combination thereof. In one embodiment, the method 700 is performed by the sub-share generator 134 of FIG. 1.

Referring to FIG. 7, at block 710, the sub-share generator 134 generates an augmented identity matrix of size (N×K), with a (K×K) identity matrix embedded in the upper rows and zero elements above and below the diagonal. An identity matrix is a matrix that has the identity element as the diagonal elements. At block 720, the sub-share generator 134 generates non-zero random values and replaces the zero above the diagonal with the random values. The sub-share generator 134 then starts to populate the matrix with non-zero random values by performing a sequence of multiply and add operations on the rows. At this point, the counter value I is set to K, which indicates the row number being operated on. At block 730, the sub-share generator 134 multiplies the I-th row by a non-zero random value. At block 740, another non-zero random value is generated and multiplied with the I-th row. This random multiple of the I-th row is added to a row below the I-th row. The operation of block 740 is repeated for each of the rows below the I-th row, each time with a new non-zero random value generated and multiplied with the I-th row, and the resulting multiple of the I-row added to each of the rows below the I-th row.

At block 750, the counter value I is decreased by one. If, at block 760, the counter value I is equal to zero, the method 700 proceeds to block 770. Otherwise, the operations at blocks 730-750 are repeated until I=1, and the method 700 proceeds to block 770. At block 770, the resulting matrix is the rank K matrix of (N×K). The resulting matrix has the same amount of random information used in its construction as an (N×K) matrix generated by the method 600 of FIG. 6.

As an example, with N=3 and K=2, a sequence of operations for generating the resulting matrix according to the method 600 is shown below, where a, b, c, d, e, f are six random values and i is the identity element.

$$\begin{matrix} i & a \\ 0 & i \\ 0 & 0 \end{matrix} \rightarrow \begin{matrix} i & a \\ 0 & b \\ 0 & 0 \end{matrix} \rightarrow \begin{matrix} i & a \\ 0 & b \\ 0 & bc \end{matrix} \rightarrow \begin{matrix} d & ad \\ 0 & b \\ 0 & bc \end{matrix} \rightarrow \begin{matrix} d & ad \\ de & b+ade \\ df & bc+adf \end{matrix}$$

Figure 8:
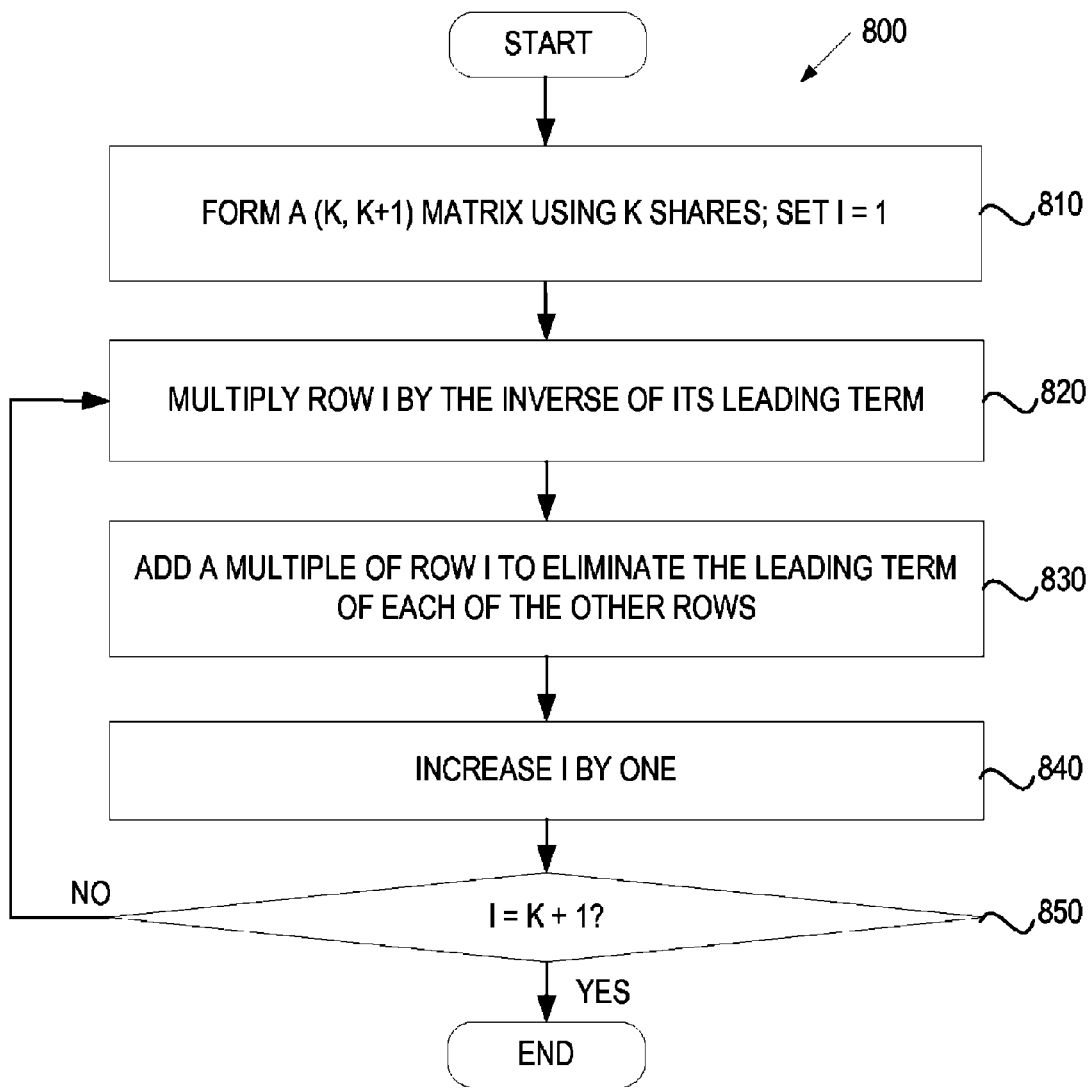
FIG. 8 a flow diagram of one embodiment of a matrix conversion method for reconstructing a share from collected sub-shares.

FIG. 8 illustrates a flow diagram of an embodiment of a method 800 for converting the matrix of collected shares to extract the secret. The method 800 may be performed by the processing logic 926 of FIG. 9 that may comprise hardware (e.g., circuitry, dedicated logic, programmable logic, microcode, etc.), software (such as instructions on a computer readable storage medium executable by a processing device), or a combination thereof. In one embodiment, the method 800 is performed by the linear operator 142 of the reconstructor 140 of FIG. 1.

Referring to FIG. 8, at block 810, the reconstructor 140 forms a (K, K+1) matrix using K of the N distributed shares. The linear operator 142 of the reconstructor 140 sets its counter value to one, which means row one is the current target row. At block 820, the linear operator 142 computes the inverse of the leading term of the target row, and multiplies the target row by the computed inverse. At block 830, the linear operator 142 adds an appropriate multiple of the target row to each of the other rows to eliminate the off-diagonal elements in the corresponding target column (e.g., if row 1 is the target row, the corresponding column is column 1). At block 840, the linear operator 142 increments the counter value by one. Thus, the target column and row number is also incremented by one. At block 850, if the counter has not reached the last row (row N), the operations of blocks 820-840 are repeated until the last row is reached. When the method 800 ends, all the off-diagonal elements of the leftmost (K×K) portion of the matrix are eliminated. The rightmost column of the matrix is the ordered K-vector that contains the secret as one of its components.

The following is an example of the secret sharing and reconstruction technique described above. In this example, the secret is an ASCII code for the letter 'A' (which is 65 in decimal representation). The field on which the operations are defined is GF(257). In this example, two of three different groups have to cooperate in recovering the secret (i.e., M=3 and K=2), and within each group, two of three different recipients have to cooperate (i.e., N=3 and K=2). To achieve this goal, the first step is to generate group shares from the secret. Following the generation of each group share, personal shares (i.e., sub-shares) are created.

To represent the secret as a 2-dimensional hyperplane (a line), one additional non-zero random element from GF(257) is generated (e.g., 42). In this example, the secret is used as the constant term. Thus, the linear equation that defines the 2-dimensional secret hyperplane is: $x_0 + 42 x_1 = 65$.

To generate the shares, $x_0$ and $x_1$ values are calculated to satisfy this linear equation. Each share contains an ordered pair $(x_0, x_1)$, which defines a point on the 2-dimensional secret hyperplane. One way to find an ordered pair $(x_0, x_1)$ is to solve for the $x_0$ term, generate random $x_1$ values, and evaluate the resulting expressions. For example:

$x_0 = 65 - 42 x_1 = = 65 + 215 x_1 \pmod{257}$.

Using the values 59, 182, and 37 for $x_1$ in the equation above yields the shares (157, 59), (131, 182), and (53, 37). It is necessary to check the shares to ensure that they do not form a degenerate solution; otherwise, the original secret cannot be reconstructed from these shares. Techniques for checking this feature will be described at the end of this example.

To generate sub-shares from a given share, calculations are performed to find intersecting hyperplanes (lines) that intersect at the point defined by the given share. The intersecting hyperplanes are generated to be different from and not parallel to the vector defined by the coefficients of the linear equation in which the secret is embedded (e.g., (1, 42)). The following description uses the share (157, 59) as an example, with the understanding that the other shares can be shared similarly.

First, construct a (3×2) matrix of rank 2, such that none of the rows is a multiple of (1, 42). This can be accomplished using the full rank construction technique as outlined in FIGS. 6 and 7, then checking each row for multiplicity. For example, the following full-rank matrix is constructed using the method 600 of FIG. 6:

$$\begin{matrix} 50 & 114 \\ 60 & 207 \\ 80 & 119 \end{matrix}$$

To ensure that this matrix is secure, it is verified that none of the rows is a multiple of (1, 42). Multiply (1, 42) (expressed as a row vector) by the leading term of each of the rows of the matrix. The 50, 60, and 80 multiples of (1, 42) mod 257 are: (50, 44), (60, 207), and (80, 19), respectively. As the 60 multiple of (1, 42) matches the second row of the matrix, the matrix cannot be used as it. To salvage this matrix, another row that is not a multiple of (1, 42) can be added to the matching row. For example, the first row can be added to the second to yield the following matrix T:

$$\begin{matrix} 50 & 114 \\ 110 & 64 \\ 80 & 119 \end{matrix}$$

Since 110*(1, 42)=(110, 251) does not match (110, 64), matrix T can be used to generate sub-shares of the share (157, 59). Multiply matrix T with the share (expressed as a 2-vector) to generate a 3-vector (184, 229, 49). Each sub-share is formed by including a row of matrix T and the corresponding element of the 3-vector. Thus, the sub-shares of (157, 59) are: (50, 114, 184), (110, 64, 229), and (80, 119, 49), each representing a 2-dimensional hyperplane. The other two shares (131, 182) and (53, 37) can be constructed similarly, with a new matrix T generated for each of the shares.

To reconstruct the secret, two of the secret points (the shares) are reconstructed from the secondary hyperplanes (the sub-shares), and then the original secret hyperplane is reconstructed from the two shares. An example of a reconstructing process of a share from two sub-shares (50, 114, 184), (110, 64, 229) is shown below, using the method 700 of FIG. 7. The reconstructed share is the rightmost column of the last (2×3) matrix.

$$\begin{matrix} 50 & 114 & 184 \\ 110 & 64 & 229 \end{matrix} \Rightarrow \begin{matrix} 1 & 249 & 199 \\ 0 & 173 & 184 \end{matrix} \Rightarrow \begin{matrix} 1 & 0 & 157 \\ 0 & 1 & 59 \end{matrix}$$

To reconstruct the original secret, reconstruct the required number of shares (e.g., (157, 59) and (131, 182)) using the process illustrated in the above example.

The original secret hyperplane has the form $x_1 + a_2 x_2 + a_3 x_3 + \ldots + a_k x_k = c$, where $x_1, x_2, \ldots, x_k$ are variables, $a_2, \ldots, a_k$ are the coefficients ($a_1$ is set to one), and c is the constant term. With K reconstructed shares available (K=2 in this example), the values of each share can be plugged into the $x_{ij}$ values of the following set of K linear equations:

$$x_{11} + a_2 x_{21} + a_3 x_{31} + \ldots + a_k x_{k1} = c$$
$$x_{12} + a_2 x_{22} + a_3 x_{32} + \ldots + a_k x_{k2} = c$$
$$\ldots$$
$$x_{1k} + a_2 x_{2k} + a_3 x_{3k} + \ldots + a_k x_{kk} = c$$

The set of K linear equations can be used to solve for the values of $a_2, \ldots, a_k$ and c to reconstruct the original secret hyperplane. The set of K linear equations can be solved by successively eliminating variables, and then back substitution. For example, the two shares (157, 59) and (131, 182) produce the following equations:

$$157 + 59a = c$$

$$131 + 182a = c$$

Subtracting the first equation from the second to generate:

$$231 + 123a == 0 \pmod{257}$$

Solving for the unknown 'a' by adding 26 to both sides, and multiplying by 140 (mod 257) produces a==42 (mod 257). Substituting 'a' back into the first equation to obtain 157+59*42==c (mod 257), and c==65.

As a result, the original linear equation for the secret hyperplane is reconstructed as: $x_0 + 42 x_1 = 65$, from which the secret can be extracted.

Alternatively, the $x_{ij}$ values can be converted to an augmented matrix, which can be reduced to an augmented identity matrix. Consider the original equations:

$$x_{11} + a_2 x_{21} + a_3 x_{31} + \ldots + a_k x_{k1} = c$$
$$x_{12} + a_2 x_{22} + a_3 x_{32} + \ldots + a_k x_{k2} = c$$
$$\ldots$$
$$x_{1k} + a_2 x_{2k} + a_3 x_{3k} + \ldots + a_k x_{kk} = c$$

Subtracting $x_{1j}$+c from both sides of each equation yields:

$$a_2 x_{21} + a_3 x_{31} + \ldots + a_k x_{k1} - c = -x_{11}$$
$$a_2 x_{22} + a_3 x_{32} + \ldots + a_k x_{k2} - c = -x_{12}$$
$$\ldots$$
$$a_2 x_{2k} + a_3 x_{3k} + \ldots + a_k x_{kk} - c = -x_{1k}$$

The coefficients of the various $a_i$ and the c are used to construct a reconstruction matrix Z, which is augmented with the negation of the various $x_{1j}$ values:

$$\begin{matrix} x_{21} & x_{31} & \ldots & x_{k1} & -1 & -x_{11} \\ x_{22} & x_{32} & \ldots & x_{k2} & -1 & -x_{12} \\ & & \ldots & & & \\ x_{2k} & x_{3k} & \ldots & x_{kk} & -1 & -x_{1k} \end{matrix}$$

Continuing with the above example with two reconstructed shares (157, 59) and (131, 182), the following augmented matrix of (2×3) can be generated:

$$\begin{matrix} 59 & -1 & -157 \\ 182 & -1 & -131 \end{matrix}$$

Normalizing the matrix by mod(257) yields:

$$\begin{matrix} 59 & 256 & 100 \\ 182 & 256 & 126 \end{matrix}$$

Reducing the normalized matrix to an augmented identity matrix can be performed with the following operations: Multiply the first row by 61, then subtract 182 times the new first row from the second row:

$$\begin{matrix} 1 & 196 & 189 \\ 0 & 50 & 166 \end{matrix}$$

Multiply the second row by 36, and subtract 196 times the new second row from the first row produce a matrix with the last column containing the a, and c values of the original secret hyperplane.

$$\begin{matrix} 1 & 0 & 42 \\ 0 & 1 & 65 \end{matrix}$$

In the above example, it is noted that the shares constructed from the secret hyperplane cannot form a degenerate solution. That is, a matrix formed by the shares has to be of full rank to allow reconstruction of the secret. For example, if the secret is represented as $x_1+42\ x_2+86\ x_3=65$ (mod 257), a first share of the secret may be (143, 151, 15), using the operations described above. Use the first share to construct the leftmost K elements of the matrix Z (mod 257) yields:

$$151 \quad 15 \quad 256$$

After generating the next share (e.g., (197, 1, 249)) and a third share (184, 237, 107), the matrix becomes:

$$\begin{matrix} 151 & 15 & 256 \\ 1 & 249 & 256 \\ 237 & 107 & 256 \end{matrix}$$

Reducing this matrix to an upper triangular matrix by row operations yields:

$$\begin{matrix} 151 & 15 & 256 \\ 1 & 249 & 256 \\ 237 & 107 & 256 \end{matrix} \Rightarrow \begin{matrix} 1 & 172 & 177 \\ 1 & 249 & 256 \\ 237 & 107 & 256 \end{matrix} \Rightarrow$$

$$\begin{matrix} 1 & 172 & 177 \\ 0 & 77 & 79 \\ 0 & 206 & 198 \end{matrix} \Rightarrow \begin{matrix} 1 & 172 & 177 \\ 0 & 1 & 238 \\ 0 & 205 & 198 \end{matrix} \Rightarrow \begin{matrix} 1 & 172 & 177 \\ 0 & 1 & 238 \\ 0 & 0 & 0 \end{matrix}$$

This result shows that the matrix constructed by the shares does not have full-rank, and it would be impossible to reconstruct the secret from these shares. To remedy this situation, a different share (e.g., (159, 78, 170)) is generated and tested until a non-degenerating share is found.

To speedup the process of checking the shares, the first K−1 shares can be kept in a short matrix, which is reduced to upper triangular form. In the above example, the rows (1 172 177) and (0 77 79) will be kept. Then, a new share is placed in the final row of the short matrix, and a triangular reduction on the matrix is performed. If resulting matrix has a row of zeros, the share is rejected and another new share is generated. This process is repeated until a share is found that produces a full rank matrix.

A simpler approach can be used to create a full rank matrix of the appropriate size, using the matrix creation method shown in FIG. 6 or 7. Then, normalize each row by multiplying by the negative of the inverse of the final element; the elements in each row before the final element become the $x_i$ values, from which $x_1$ is calculated. For example, to create four shares for our secret $x_1+42\ x_2+86\ x_3=65$ (mod 257), a rank 3 (4×3) matrix can be created, such as the one below:

$$\begin{matrix} 148 & 136 & 130 \\ 203 & 10 & 75 \\ 92 & 152 & 218 \\ 253 & 251 & 110 \end{matrix}$$

Then, multiply the rows by 85, 233, 145, and 7, respectively, yielding:

$$\begin{matrix} 244 & 252 & 256 \\ 11 & 17 & 256 \\ 233 & 195 & 256 \\ 229 & 215 & 256 \end{matrix}$$

The first two entries in each row are then used to construct the shares (13, 244, 252), (197, 11, 17), (237, 233, 195) and (227, 229, 215).

The following is another example that illustrates a scenario in which one level of the secret sharing hierarchy requires more cooperating parties than another level. In this example, two out of three divisions are needed to reconstruct the original secret, but three of five recipients in each division are needed to reconstruct the divisional shares.

In a first approach, the thresholds for reconstruction can be changed so that they match from level to level. The thresholds can be changed by giving one or both levels extra shares (or sub-shares). For example, each division can have two shares, and the overall secret will require three shares total. Thus, the top-level sharing scheme is effectively converted to a (6, 3) scheme, with M=6 and K=3. Each division's two shares will be split into five sub-shares, and every recipient will get one sub-share of each of these five sub-shares. Symbolically, the overall secret S would be split into shares $SD_1$, $SD_2$, $SD_3$, $SD_4$, $SD_5$, and $SD_6$, such that any three of these shares may be used to reconstruct S. Each division will get two of these shares, and each share will be split into five sub-shares and distributed to the recipients. For example, $SD_1$ and $SD_2$ may represent the shares for the first division. $SD_1$ would be split into sub-shares $SD_{11}$, $SD_{12}$, $SD_{13}$, $SD_{14}$, and $SD_{15}$, while $SD_2$ would be split into sub-shares $SD_{21}$, $SD_{22}$, $SD_{23}$, $SD_{24}$, and $SD_{25}$. One recipient in the first division would receive the sub-shares $SD_{11}$ and $SD_{21}$, another recipient would receive the sub-shares $SD_{12}$ and $SD_{22}$, and so on. Three recipients would have enough shares to reconstruct both $SD_1$ and $SD_2$. Another division would be able to reconstruct $SD_3$ and $SD_4$, and the last division would be able to reconstruct $SD_5$ and $SD_6$. Any two divisions together can reconstruct four shares (e.g., $SD_1$, $SD_2$, $SD_3$, and $SD_4$) and would be able to reconstruct the secret S from any three of those four reconstructed shares.

Alternatively, a global share may be created from the top-level secret and provided as-is to each division. The global share may be distributed together with the individual shares derived from the top-level secret. Symbolically, the secret S may be split into the shares $S_G$, $SD_1$, $SD_2$, and $SD_3$, where $S_G$ is a global share. $SD_1$, $SD_2$, and $SD_3$ are each split into 5 parts (e.g., $SD_{11}$, $SD_{12}$, ... $SD_{15}$, ... $SD_{35}$). Every recipient would receive a divisional share $SD_{ij}$ plus the global share $S_G$. Two divisions with reconstructed $SD_i$ and $SD_j$, together with $S_G$, would be able to reconstruct S. Thus, the top-level sharing scheme is effectively converted to a (4, 3) scheme, with M=4 and K=3.

In yet another alternative embodiment, some of the random information can be fixed at one of the levels and provided outside of the secret sharing scheme. For example, the original secret is embedded in a 3-dimensional hyperplane (a plane, in this case). Using the example of sharing the letter 'A' using GF(257), the secret in a 3-dimensional equation can be represented as: $x_1+57\ x_2+192\ x_3=65$, with 57 and 192 being randomly generated values.

First, three shares are constructed from the 3-dimensional equation using the method 200 of FIG. 2. Each share is augmented with the information that the coefficient of the $x_2$ term is 57. The use of the 3-dimensional equation generates ordered triplets for the shares (as required by the operations at the next level), but provides enough additional information that the secret can be reconstructed with one fewer shares (e.g., 2 shares) than would otherwise be the case. Continuing with this example, the following shares are generated: (17, 81, 181), (173, 49, 13), and (86, 225, 166). The original secret can be reconstructed with only two shares and the knowledge that the coefficient of the $x_2$ term is 57, by considering $x_1+57\ x_2$ to be a single term. The following linear equations are formed by using the first two shares:

$$17+57*81+181a_3=c \pmod{257}$$

$$173+57*49+13a_3=c \pmod{257}$$

The unknowns $a_3$ and c can be solved by subtracting $x_1+57\ x_2+c$ from both sides:

$$181a_3-c=-17-57*81$$

$$13a_3-c=-173-57*49$$

Forming the following (2×3) matrix using the above equations and reducing it to an augmented identity matrix yields the (192, 65) in the rightmost column.

$$\begin{array}{ccc} 181 & 256 & 249 \\ 13 & 256 & 118 \end{array} \Rightarrow \begin{array}{ccc} 1 & 0 & 192 \\ 0 & 1 & 65 \end{array}$$

Communicating the additional parameter can either be done by explicitly attaching it to each distributed share, or by normalizing the sub-shares so that some of the components of each share have an exploitable relationship with the parameter. For example, the sum of the first two parameters of each share can be 57 (mod 257). To create the sub-shares of (17, 81, 181), a rank 3, (5×3) matrix is constructed as in the earlier example. After normalizing for the sum of the first two elements in each row (e.g., by multiplying each row by a suitable factor mod(257)), the following matrix T is generated:

$$\begin{array}{ccc} 159 & 155 & 35 \\ 167 & 147 & 90 \\ 32 & 22 & 158 \\ 76 & 238 & 45 \\ 40 & 17 & 90 \end{array}$$

This matrix T can be used to share the secret (17, 81, 181), yielding the five shares (159, 155, 35, 5), (167, 147, 90, 196), (32, 22, 158, 84), (76, 238, 45, 188), and (40, 17, 90, 100).

Figure 9:
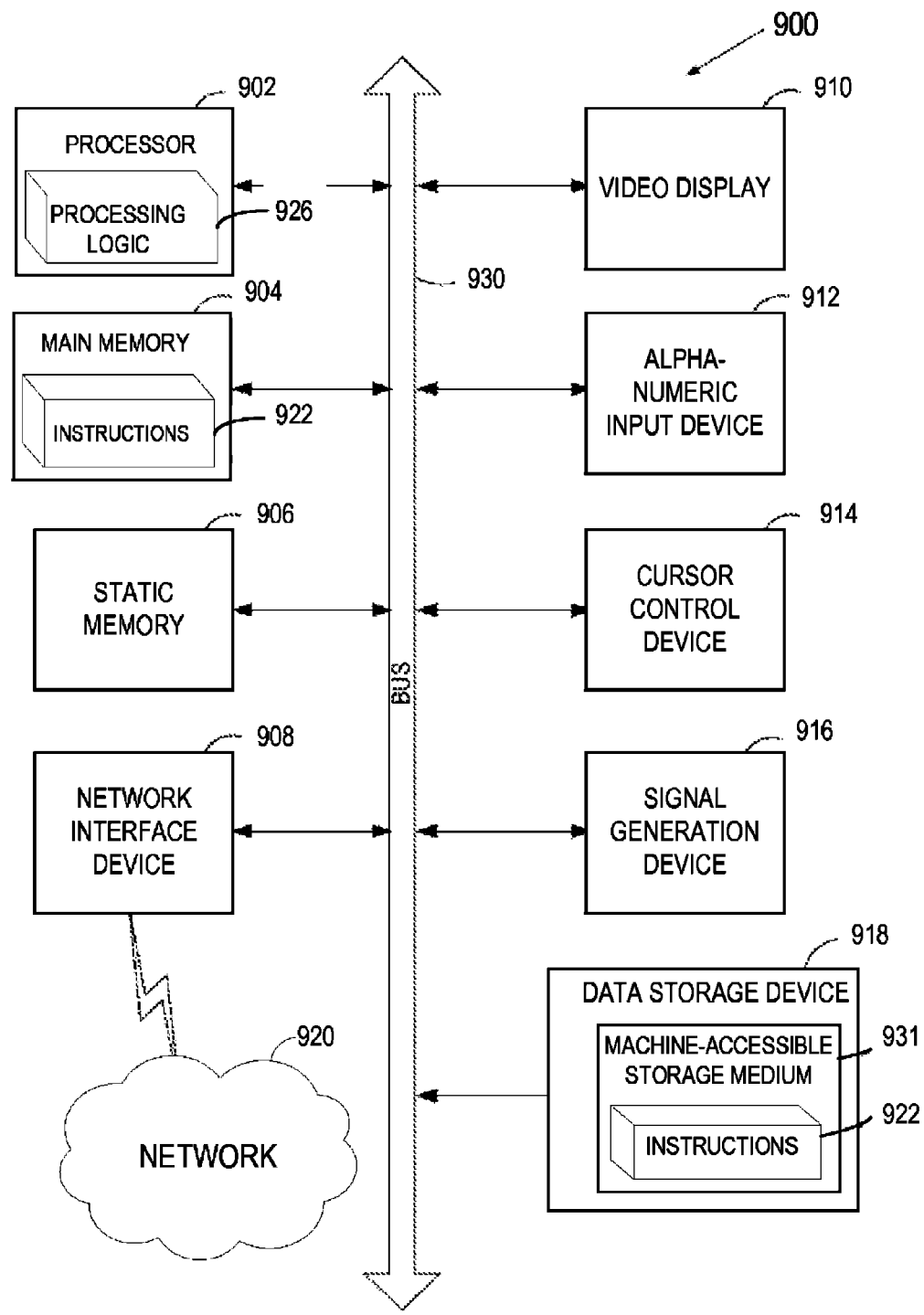
FIG. 9 illustrates a block diagram of an exemplary computer system implementing some embodiments of the present invention.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-readable storage medium (or more specifically a computer-readable storage medium) 931 on which is stored one or more sets of instructions (e.g., software 922) embodying any one or more of the methodologies or functions described herein. The software 922 may also reside, completely or at least partially, within the main memory 904 and/or within the processing device 902 during execution thereof by the computer system 900, the main memory 904 and the processing device 902 also constituting machine-readable storage media. The software 922 may further be transmitted or received over a network 920 via the network interface device 908.

The machine-readable storage medium 931 may also be used to store the secret 106 of FIG. 1. While the machine-readable storage medium 931 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and a system for sharing a secret using linear interpolation have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
receiving a secret;
generating, by a processing device of a computer system, a non-deterministic element;
forming a linear equation using the secret and the non-deterministic element;
generating, by the processing device, a first share of the secret corresponding to a first solution to the linear equation, a second share of the secret corresponding to a second solution to the linear equation, and a third share of the secret corresponding to a third solution to the linear equation, wherein the secret is reconstructable from a proper subset of {the first share, the second share, the third share};
distributing, via a network interface device, the first share and the third share to a first entity;
determining, by the processing device, a first number of sub-shares to divide the second share into, wherein the first number of sub-shares is an integer greater than one, and wherein the determining is in view of at least one of: a first quantity of computing resources of the computer system that are available, or a second quantity of storage resources of the computer system that are available;
dividing the second share of the secret into a plurality of sub-shares, wherein the size of the plurality of sub-shares is in view of the first number;
distributing via the network interface device, to each of a plurality of sub-entities of a second entity, the third share and a respective one of the plurality of sub-shares;
receiving a request for the secret;
in response to the request for the secret, transmitting via the network interface device:
  a first request to the first entity for the first share and the third share distributed to the first entity,
  a second request to a first sub-entity of the second entity for the respective one of the plurality of sub-shares distributed to the first sub-entity, and
  a third request to a second sub-entity of the second entity for the respective one of the plurality of sub-shares distributed to the second sub-entity;
receiving at least one response to the first request, the second request, or the third request;
reconstructing, by the processing device, the secret in view of the at least one response; and
transmitting the reconstructed secret to a sender of the request for the secret.

2. The method of claim 1, wherein the linear equation comprises a constant term in view of the secret and a non-constant term in view of the non-deterministic element.

3. The method of claim 1, wherein the forming of the linear equation comprises:

extending the length of the secret with non-deterministic information to obtain an extended secret; and
grouping elements of the extended secret into a plurality of groups and using each group as a coefficient of the linear equation.

4. The method of claim 1,
wherein the linear equation is $a_1x_1+a_2x_2+a_3x_3+ \ldots a_Kx_K=c$;
wherein $a_2, a_3, \ldots, a_K$ are non-deterministic and comprise the non-deterministic element;
wherein $x_1, x_2, \ldots, x_K$ are variables; and
wherein c is a constant term in view of the secret.

5. The method of claim 1, wherein the linear equation defines a hyperplane and the first share of the secret corresponds to a first point on the hyperplane, the second share of the secret corresponds to a second point on the hyperplane, and the third share of the secret corresponds to a third point on the hyperplane.

6. The method of claim 1, wherein the linear equation comprises a constant term and more than three non-constant terms.

7. The method of claim 1, wherein the linear equation comprises a non-constant term that has a known coefficient.

8. A computer system comprising:
a network interface device;
a memory to store a secret; and
a processing device, operatively coupled to the memory and to the network interface device, to:
generate a non-deterministic element;
form a linear equation using the secret and the non-deterministic element;
generate a first share of the secret corresponding to a first solution to the linear equation, a second share of the secret corresponding to a second solution to the linear equation, and a third share of the secret corresponding to a third solution to the linear equation, wherein the secret is reconstructable from a proper subset of {the first share, the second share, the third share};
distribute, via the network interface device, the first share and the third share to a first entity;
determine a first number of sub-shares to divide the second share into, wherein the first number of sub-shares is an integer greater than one, and wherein the determining is in view of at least one of: a first quantity of computing resources of the computer system that are available, or a second quantity of storage resources of the computer system that are available;
divide the second share of the secret into a plurality of sub-shares, wherein the size of the plurality of sub-shares is in view of the first number;
distribute via the network interface device, to each of a plurality of sub-entities of a second entity, the third share and a respective one of the plurality of sub-shares;
receive a request for the secret;
in response to the request for the secret, transmit via the network interface device:
a first request to the first entity for the first share and the third share distributed to the first entity,
a second request to a first sub-entity of the second entity for the respective one of the plurality of sub-shares distributed to the first sub-entity, and
a third request to a second sub-entity of the second entity for the respective one of the plurality of sub-shares distributed to the second sub-entity;

receive at least one response to the first request, the second request, or the third request;
reconstruct the secret in view of the at least one response; and
transmit the reconstructed secret to a sender of the request for the secret.

9. The system of claim 8, wherein the linear equation comprises a constant term in view of the secret and a non-constant term in view of the non-deterministic element.

10. The system of claim 8, wherein the processing device is further to:
extend the length of the secret with non-deterministic information to obtain an extended secret; and
group elements of the extended secret into a plurality of groups and using each group as a coefficient of the linear equation.

11. The system of claim 8,
wherein the linear equation is $a_1x_1+a_2x_2+a_3x_3+ \ldots a_Kx_K=c$;
wherein $a_2, a_3, \ldots, a_K$ are non-deterministic and comprise the non-deterministic element;
wherein $x_1, x_2, \ldots, x_K$ are variables; and
wherein c is a constant term in view of the secret.

12. A non-transitory computer-readable medium having instructions encoded thereon which, when executed by a processing device of a computer system, cause the processing device to:
receive a secret;
generate, by the processing device, a non-deterministic element;
form a linear equation using the secret and the non-deterministic element;
generate, by the processing device, a first share of the secret corresponding to a first solution to the linear equation, a second share of the secret corresponding to a second solution to the linear equation, and a third share of the secret corresponding to a third solution to the linear equation, wherein the secret is reconstructable from a proper subset of {the first share, the second share, the third share};
distribute, via a network interface device, the first share and the third share to a first entity;
determine, by the processing device, a first number of sub-shares to divide the second share into, wherein the first number of sub-shares is an integer greater than one, and wherein the determining is in view of at least one of: a first quantity of computing resources of the computer system that are available, or a second quantity of storage resources of the computer system that are available;
divide the second share of the secret into a plurality of sub-shares, wherein the size of the plurality of sub-shares is in view of the first number;
distribute via the network interface device, to each of a plurality of sub-entities of a second entity, the third share and a respective one of the plurality of sub-shares;
receive a request for the secret;
in response to the request for the secret, transmit via the network interface device:
a first request to the first entity for the first share and the third share distributed to the first entity,
a second request to a first sub-entity of the second entity for the respective one of the plurality of sub-shares distributed to the first sub-entity, and a third request to a second sub-entity of the second entity for the respective one of the plurality of sub-shares distributed to the second sub-entity;
receive at least one response to the first request, the second request, or the third request;
reconstruct, by the processing device, the secret in view of the at least one response; and transmit the reconstructed secret to a sender of the request for the secret.

13. The non-transitory computer-readable medium of claim 12, wherein the linear equation comprises a constant term in view of the secret and a non-constant term in view of the non-deterministic element.

14. The non-transitory computer-readable medium of claim 12, wherein the forming of the linear equation comprises:
   extending the length of the secret with non-deterministic information to obtain an extended secret; and
   grouping elements of the extended secret into a plurality of groups and using each group as a coefficient of the linear equation.

* * * * *